United States Patent [19]

Schieltz

[11] Patent Number: 5,659,787
[45] Date of Patent: Aug. 19, 1997

[54] DATA COMMUNICATION NETWORK WITH HIGHLY EFFICIENT POLLING PROCEDURE

[75] Inventor: Steven W. Schieltz, Boca Raton, Fla.

[73] Assignee: Sensormatic Electronics Corporation, Deerfield Beach, Fla.

[21] Appl. No.: 451,862

[22] Filed: May 26, 1995

[51] Int. Cl.$^6$ ........................................... G06F 9/00
[52] U.S. Cl. .............. 395/200.56; 395/838; 395/200.54
[58] Field of Search .................... 395/800, 200.11, 395/200.1, 838; 370/95.2

[56] References Cited

U.S. PATENT DOCUMENTS

| | | | |
|---|---|---|---|
| 4,829,297 | 5/1989 | Ilg et la. | 370/90 |
| 4,940,974 | 7/1990 | Sojka | 370/95.2 |
| 4,996,518 | 2/1991 | Takahashi et al. | 340/518 |
| 5,140,586 | 8/1992 | Klaper et al. | 370/85.5 |
| 5,349,632 | 9/1994 | Nagashima | 379/61 |
| 5,371,899 | 12/1994 | Kuznicki et al. | 455/34.1 |
| 5,416,777 | 5/1995 | Kirkham | 370/85.8 |
| 5,436,905 | 7/1995 | Li et al. | 370/95.2 |
| 5,457,689 | 10/1995 | Marvit et al. | 370/85.8 |

OTHER PUBLICATIONS

B. Stockman, "A Model for Common Operational Statistics", Network Working Group, RFC 1404, Jan. 93, pp. 1–27.

Tobagi, Fouad A.; "Multiaccess protocols in Packet Communication Systems"; *IEEE Transactions on Communications*, vol. Com-28, No. 4, Apr. 1980, pp. 468–488.

*Primary Examiner*—Mehmet B. Geckil
*Attorney, Agent, or Firm*—Robin, Blecker, Daley & Driscoll

[57] ABSTRACT

A local area data network interconnects devices which make up a video surveillance system. The devices attached to the local area network are divided into distinct classes which are polled with different degrees of frequency. Devices are dynamically reassigned from class to class depending on each device's current requirements for network access. Group polling is also employed, with resolution of contention by means of a probing algorithm. Negative responses to polling messages are formed as a series of line transitions that require less time than transmission of a single data byte. Polling messages have a distinct length in terms of bytes that is shorter than any other message transmitted on the network. Polled devices are permitted to transfer data directly to peer devices in response to polling messages.

62 Claims, 7 Drawing Sheets

DATA COMMUNICATION NETWORK WITH HIGHLY EFFICIENT POLLING PROCEDURE

FIELD OF THE INVENTION

This invention is directed to a data communication network, and more particularly to a data communication network for use with a closed circuit television surveillance system.

BACKGROUND OF THE INVENTION

It is known to provide data communication networks whereby a number of devices which are each capable of sending and receiving data messages can send and receive data messages from and to each other. One commonly used type of data network is a local area network (LAN) in which the data transmitting and receiving devices are all connected to a common transmission medium such as a twisted-wire pair or a coaxial cable.

Use of a common transmission medium in the data network makes necessary some provision for resolving or preventing conflicting attempts to access the transmission medium. One well known technique for preventing conflicts entails providing a master station which sequentially polls each of the other stations, with the other stations being permitting to access the transmission medium only in response to a polling message directed to the particular device which desires to access the medium. Conventional polled networks can provide satisfactory performance when each of the devices requires frequent access to the transmission medium, but if the message traffic is infrequent or "bursty", a polled network does not use the transmission medium efficiently. Also, if the number of devices connected to the transmission medium is large, there may be unacceptably long delays in permitting access to the transmission medium.

It is also known to provide so-called random access control techniques, which are generally more suitable for "bursty" traffic. For example, one known random access technique is referred to as "carrier sense multiple access" (CSMA). According to this technique, when a device has data to transmit, the device "listens" to the transmission medium to determine whether the medium is in use, and if not, proceeds to transmit data. If there is a collision, i.e., if two devices transmit respective data packets that overlap in time, then the terminals retransmit their respective data packets in a manner designed to avoid future collisions, such as by delaying a random period before retransmitting.

A disadvantage of the CSMA technique is that the likelihood of collisions increases as the number of devices attached to the transmission medium and the frequency of traffic increases. This may result in unacceptable delays. In addition, this technique is "non-deterministic" in the sense that it can not be known with certainty that a device will be able to gain access to the transmission medium within any given finite period of time. This may not be an acceptable characteristic in the case of time-sensitive data.

There are particularly difficult challenges in managing a local area network which is used to interconnect video surveillance cameras, camera control consoles, and other devices constituting a closed circuit television surveillance system. Such a LAN may include a relatively large number of devices with only infrequent needs for network access and also a smaller number of devices with frequent need for access. In addition, there may be substantial differences in size among the data packets to be transmitted. With access control techniques that have heretofore been applied to LAN's used in connection with video surveillance systems, it has not been possible to achieve satisfactory performance without severely limiting the number of devices (cameras and controllers) connected to the LAN.

It can be contemplated to "partition" the video surveillance system, by providing separate LANs for respective portions of the video surveillance system, but only at the cost of preventing certain control consoles from controlling video cameras not attached to the same LAN as the control consoles. Thus, partitioning the system is inconsistent with the desirable characteristic of permitting every console to control every camera.

OBJECTS AND SUMMARY OF THE INVENTION

It is accordingly an object of the invention to provide an improved local area data network for interconnecting video cameras, camera control consoles and other devices making up a video surveillance system.

It is another object of the invention to provide a data communication network which exhibits both high throughput and deterministic operation.

It is still a further object of the invention to provide a data communication network which efficiently serves more than one type of data transmitting and receiving device.

It is yet a further object of the invention to provide a data communication network which efficiently handles data packets of varying sizes.

In accordance with a first aspect of the invention, there is provided a method of polling a plurality of interconnected devices, with the devices each being capable of receiving and sending data messages, the plurality of devices including a preferred group of devices and a subordinate group of devices, with the preferred and subordinate groups being mutually exclusive, and the devices of the preferred group being polled at least N/M times as frequently as the devices of the subordinate group, where N and M are both positive integers with N>M. According to further practice in accordance with this aspect of the invention, M may be equal to 1.

According to still further practice in accordance with this aspect of the invention, each of the devices responds to polling by transmitting either a first type of response indicating that the device has no data to send, or a second type of response indicating that the device has data to send, and the method according to this aspect further includes the steps of determining how frequently each device of the preferred group transmits the first type of response and reassigning the device from the preferred group to the subordinate group if the device transmits the first type of response more frequently than a predetermined degree of frequency.

According to further practice in accordance with this aspect of the invention, the method may also include the steps of determining how frequently each device of the subordinate group transmits the second type of response, and reassigning that device from the subordinate group to the preferred group if the device transmits the second type of response more frequently than a predetermined degree of frequency.

In accordance with this aspect of the invention, more frequent access to the data network is provided to devices having a more frequent need for access, and the frequency with which access to the network is permitted is dynamically and adaptively changed according to the demonstrated needs of the devices.

According to another aspect of the invention, there is provided a method of polling a plurality of interconnected devices, with the devices being capable of receiving and sending data messages, and the plurality of devices including a first group and a second group of the devices, the two groups being mutually exclusive, and the method including the steps of transmitting a polling message at least N times to each device of the first group of devices during a period of time, N being an integer greater than 2, and transmitting a polling message once and only once during the period of time to each device of the second group of devices.

According to still another aspect of the invention, there is provided a method of polling a plurality of interconnected devices, with the devices each being capable of receiving and sending data messages and the plurality of devices including a preferred group and a subordinate group of the devices, the preferred and subordinate groups being mutually exclusive, and the method including the steps of first transmitting a first polling message once and only once in sequence to each device of the subordinate group of devices and second transmitting a polling message at least N times to each device of the preferred group of devices after commencing the first transmitting step and before transmitting any polling message other than the first polling message to any device of the second subordinate group, with N being an integer greater than 1.

According to still another aspect of the invention, there is provided a method of polling a plurality of interconnected devices, with the devices each being capable of receiving and sending data messages and the plurality of devices including a first preferred group of devices, a second preferred group of devices and a subordinate group of devices, the first preferred group, the second preferred group and the subordinate group all being mutually exclusive, with the devices of the first preferred group being polled at least N times as frequently as the devices of the subordinate group, the devices of the second preferred group being polled at least N times as frequently as the devices of the subordinate group and with N and M both being integers greater than one and being different from each other. In accordance with further practice according to this aspect of the invention, N may be an integral multiple of M.

In accordance with still another aspect of the invention, there is provided a method of polling a plurality of interconnected devices, with the devices each being capable of receiving and sending data messages and the plurality of devices including a first group and a second group of the devices, the first and second groups each consisting of a respective plurality of the devices, and the method including the steps of first transmitting to each device of the first group of devices, according to a predetermined sequence, a polling message that is uniquely addressed to the respective device of the first group of devices, after the first transmitting step, second transmitting a group polling message simultaneously to all devices of the second group of devices, detecting whether contention among the devices of the second group occurs in response to the group polling message, and if contention is detected at the detecting step, resolving the detected contention by performing a probing algorithm.

Practice in accordance with this aspect of the invention provides relatively frequent network access to preferred devices via a dedicated opportunity to access the network, while efficiently providing less frequent access to other devices.

According to still another aspect of the invention, there is provided a method of polling a plurality of interconnected devices with the devices each being capable of receiving and sending data messages and the method including the steps of first transmitting to each of the plurality of devices, according to a predetermined sequence, a polling message that is uniquely addressed to the respective device, then, after the first transmitting step, second transmitting a group polling message simultaneously to all of the devices, detecting whether contention among the devices occurs in response to the group polling message, and if contention is detected at the detecting step, resolving the detected contention by performing a probing algorithm.

In accordance with this aspect of the invention, each device is allotted a predetermined opportunity to access the network while permitting more frequent network access to those devices which may, on occasion, require more frequent access.

According to yet another aspect of the invention, there is provided a method of polling a plurality of interconnected devices, with the devices each being capable of receiving and sending data messages and the plurality of devices including a preferred group of devices and a subordinate group of devices, the preferred and subordinate groups being mutually exclusive, and the method including the steps of polling the devices of the subordinate group by means of polling messages, each addressed to a distinct one of the devices of the subordinate group, with a first degree of frequency, polling the devices of the preferred group by means of polling messages each addressed to a distinct one of the devices of the preferred group, and with a second degree of frequency which is N/M times as great as the first degree of frequency, N and M both being positive integers with N>M, transmitting a group polling message simultaneously to all devices of the subordinate group of devices with a third degree of frequency, detecting whether contention among the devices of the subordinate group occurs in response to the group polling message, and, if contention is detected at the detecting step, resolving the detected contention by performing a probing algorithm.

In accordance with further practice based on the latter aspect of the invention, the third degree of frequency is the same as the first degree of frequency; M =1; and N is greater than 2.

According to still a further aspect of the invention, there is provided a method of polling a plurality of interconnected devices, with the devices each being capable of receiving and sending data messages and each of the data messages other than polling messages being in a first predetermined format consisting of at least N bytes, N being an integer greater than one, and the method including the steps of sending the polling messages in sequence to each of the devices, where the polling messages each are in a second predetermined format consisting of M bytes with M being a positive integer that is less than N. According to further practice based on the latter aspect of the invention, M=5; N=6; each of the polling messages consists of a start flag byte, an address byte for identifying a respective one of the devices to which the polling message is sent, an error detection code consisting of two bytes, and a stop flag byte; while each of the data messages other than polling messages includes at least a start flag byte, an address byte for identifying a respective one of the devices to which the data message is sent, a type byte for identifying a type of the data message, an error correction code consisting of two bytes and a stop flag byte. According to further practice, some of the data messages also include at least one byte of data to be transferred, and none of the data messages includes more than 92 bytes of data to be transferred.

According to still a further aspect of the invention, there is provided a method of operating a data network formed of a plurality of interconnected devices including a master polling device and other devices, and the method includes the steps of transmitting a respective polling message in sequence from the master polling device to each of the other devices, and transmitting data messages from the other devices in response to the respective polling messages, with the data messages transmitted from the other devices in response to the respective polling messages each consisting of at least N bytes and the respective polling messages each consisting of M bytes, with N and M being positive integers and M<N.

According to yet another aspect of the invention, there is provided a method of operating a data network formed of a plurality of interconnected devices including a master polling device and other devices and the method including the steps of transmitting a polling message from the master polling device to a first one of the other devices, and in response to the polling message, transmitting a data message directly from a first one of the other devices to a second one of the other devices.

According to still a further aspect of the invention, there is provided a method by which a polled device responds to a polling message received by the polled device from a data network, with the network including a plurality of devices which are capable of receiving and sending data messages, network means for interconnecting the devices for data communication among the devices, and means for sending polling messages to the plurality of devices, where the method includes the steps of sending a data message consisting of at least N bytes if the polled device has data to send, N being a positive integer, and transmitting a poll response signal that does not include any bytes if the polled device has no data to send.

According to further practice based on the latter aspect of the invention, the poll response signal consists of a plurality of line transitions followed by an absence of line transitions for a period of at least two clock cycles, and the plurality of line transitions includes not less than six line transitions. According to still further practice, the data message is transmitted by FM-0 encoding and the poll response signal consists of four '0' bits followed by the absence of line transitions.

DESCRIPTION OF THE PREFERRED EMBODIMENTS

Figure 1:
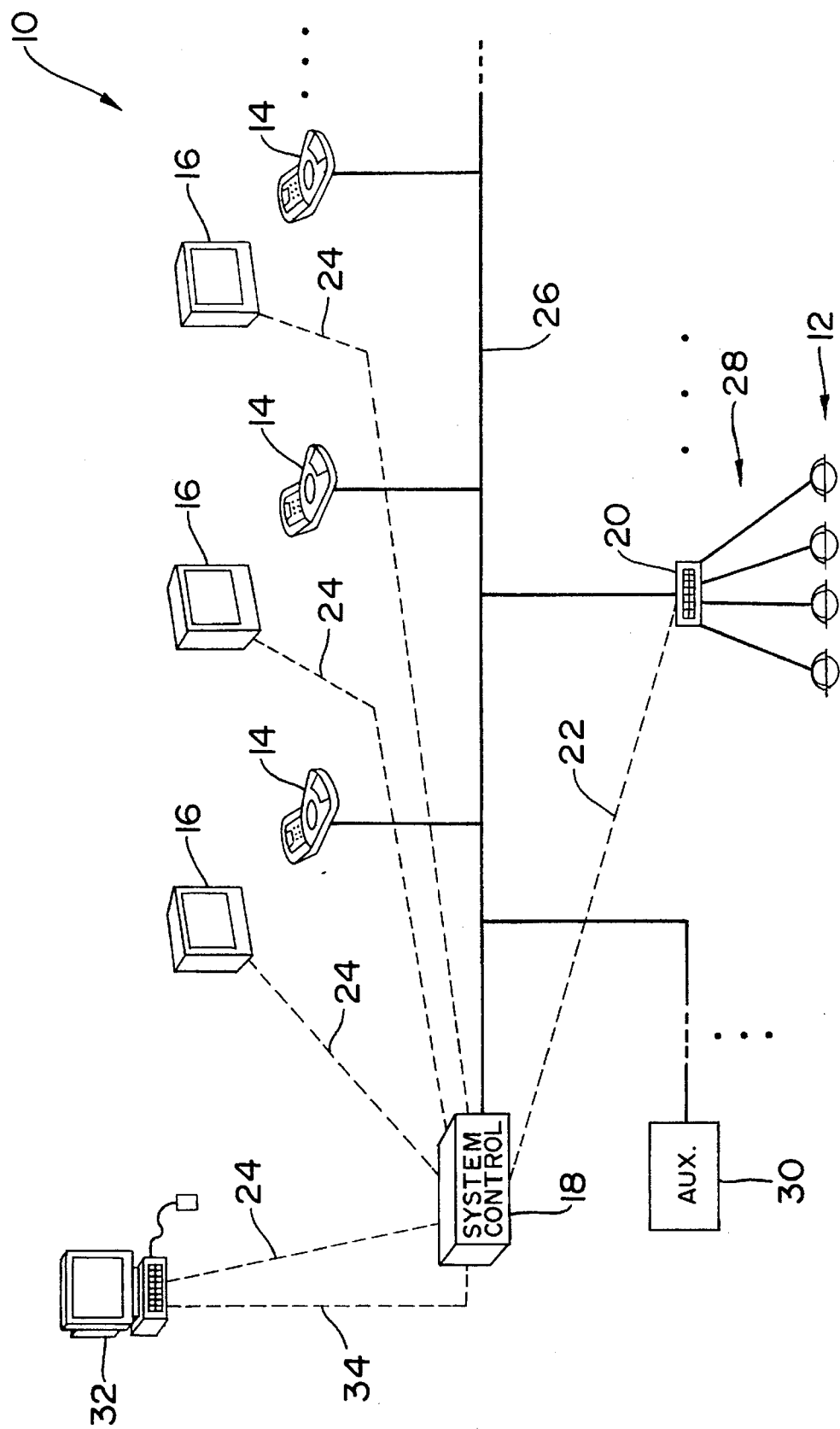
FIG. 1 is a schematic block diagram of a closed circuit television video surveillance system, including a local area network provided in accordance with the invention for data communication among the devices making up the surveillance system.

The invention will now be described in greater detail with reference to the drawings, in which the same or similar elements are indicated throughout by corresponding reference numerals.

System Overview

Referring initially to FIG. 1, reference numeral 10 generally indicates a closed circuit television surveillance system. The system 10 includes a number of television cameras, represented by surveillance domes 12. Although only four surveillance domes 12 are explicitly shown in FIG. 1, it should be understood that the surveillance system 10 may include a much larger number of cameras, and that it is contemplated that some or all of the cameras may not be enclosed within domes. All of the cameras may be of conventional types, such as those sold by the assignee of this application for video surveillance applications.

The surveillance system 10 also includes a number of camera control consoles 14 which are used to control pan, tilt, zoom, focus, etc. of the cameras 12. Each console 14 may be of conventional design, and may be a compact console incorporating a joystick and keypad such as those distributed by the assignee of this application under the trademark "TOUCHTRACKER".

The system 10 further includes a number of monitors 16 for displaying the video signals generated by the surveillance dome cameras 12. Selection of a particular camera to be the source of the signal displayed on a particular monitor can be controlled by an operator by actuating appropriate keys on a control console 14. Again, it should be understood that the number of control consoles 14 and monitors 16 making up the surveillance system 10 may be larger than the three consoles and three monitors shown in FIG. 1.

A system control module 18 is provided in the surveillance system 10 to distribute video signals from the cameras 12 to the monitors 16 according to instructions received by the consoles 14. As will be described in more detail below, the system controller 18 also manages data communication between the consoles 14 and cameras 12.

The video signals generated by the cameras 12 are transmitted to the system control module 18 by way of a conventional junction box 20 and an input video signal connection 22. After appropriate switching within the system control module 18, respective output video signals are provided over output video signal connections 24 to the monitors 16.

A local area network connection 26 is provided to interconnect for data communication the system control module 18, the cameras 12 and the control consoles 14. The LAN connection 26 is preferably arranged in a bus or star configuration or in a combination thereof, and may advantageously be formed from a twisted wire pair, shielded or unshielded. It will be noted that the connection to the LAN 26 for the cameras 12 passes through the junction box 20 and connectors 28, which preferably include separate cabling or wiring for the video signals sent from, and the data communications provided to and from, the cameras 12.

As depicted in FIG. 1, the LAN 26 also has connected thereto one or more auxiliary devices 30, which are neither cameras nor control consoles. The auxiliary devices may include, for example, remotely located video switching devices, devices for sending an alarm message upon the occurrence of certain predetermined events (such as the opening of a door or a merchandise display cabinet), and devices for sensing whether lights are on or off and/or for turning lights on and off.

The surveillance system 10 also includes a workstation 32 which includes a keyboard and monitor and is used for configuring the video surveillance system 10 and performing other administrative functions with respect to the system. The workstation 32 may be a conventional device, such as the graphics-based terminal distributed by the assignee of the present invention under the trademark VRS 2000.

The workstation 32 is connected to the system control 18 via an output video signal connection 24 which allows the workstation 32 to receive and display video signals routed from the cameras 12 by way of the system control module 18. The workstation 32 also is connected for data communication with the system control module 18 by way of a separate local area network connection 34. According to a preferred embodiment of the invention, the LAN 34 is operated in accordance with the well known ETHERNET communications protocol.

Although not specifically shown in FIG. 1, it should be understood that the surveillance system 10 may include other components typically provided in such systems, such as video cassette recorders, and video signal multiplexer components which permit two or more video signals to be displayed in split screen fashion on the video monitors. The surveillance system 10 may also be interconnected via the ETHERNET LAN 34 to other systems, such as facility access control systems.

Control Module

Figure 2:
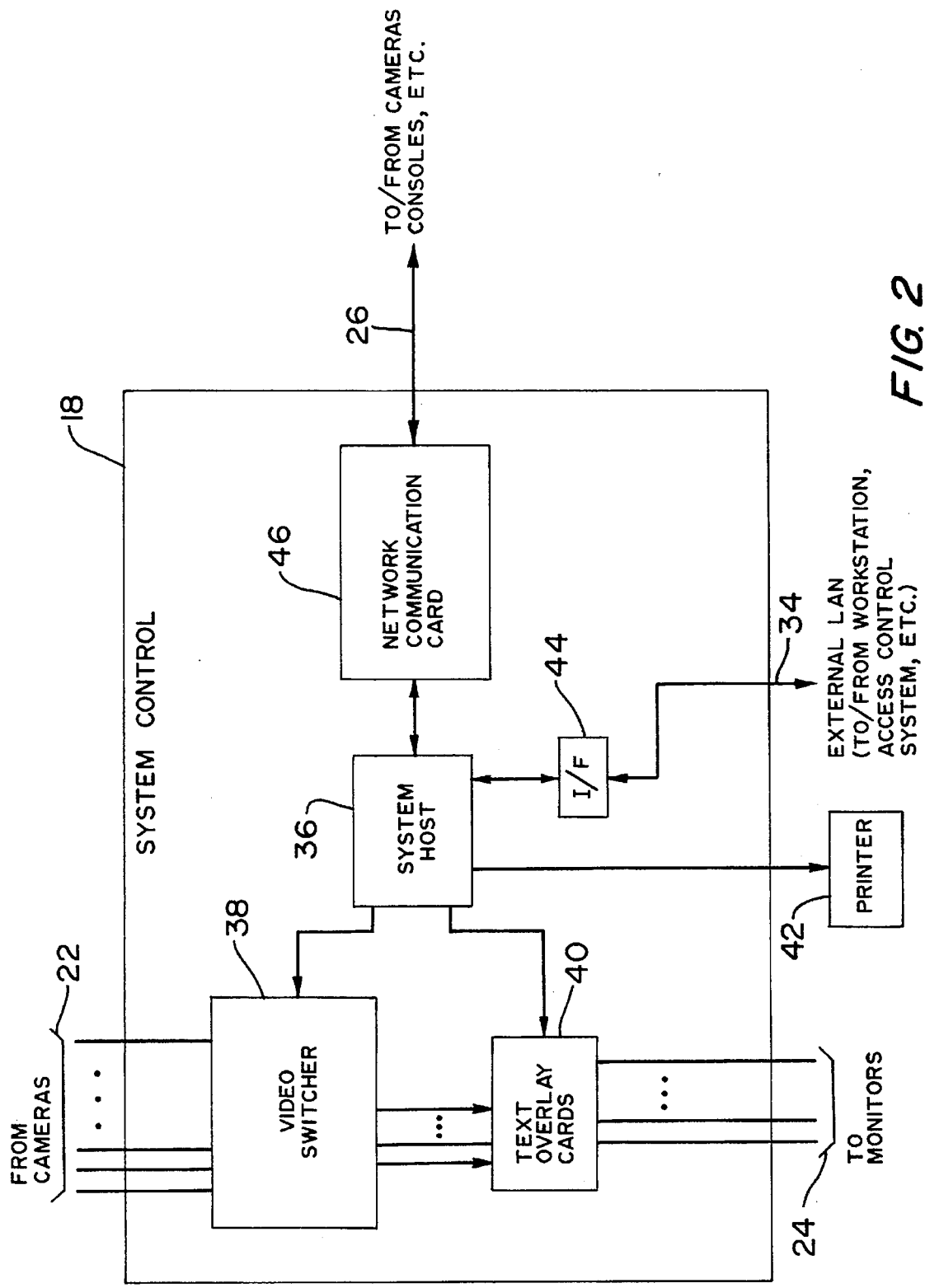
FIG. 2 is a block diagram of a system control module for the surveillance system and local area network of FIG. 1.

The system control module 18 will now be described in more detail with reference to FIG. 2. The system control module 18 includes a system host processor 36 which controls the operations of the system control module 18, and also, to a large extent, the operations of the video surveillance system 10. The system host 36 may conveniently be implemented as a conventional '386 personal computer board.

The system control module 18 includes a video switching component 38 which is connected to the system host 36 and operates under control of control signals output from the system host 36. The video switcher 38 receives input video over the connections 22, switches the input video signals according to instructions received from the system host 36 and outputs the switched video signals to text overlay cards 40. The text overlay cards 40 are also connected for control by the system host 36 and produce appropriate text overlays in response to instructions received from the system host 36. The switched video signals, with text overlays added thereto, are output to the monitors 16 and the work station 32 over the above-mentioned output video connections 24.

The system host 36 is also connected to a printer 42 by which printed reports may be output, and is connected via communications interface circuitry 44 to the above-mentioned EHTERNET LAN 34.

Each of the elements 38, 40, 42 and 44 may be of known design as in the surveillance system control hardware distributed by the assignee of the present invention under the trademark "VIDEO MANAGER".

The system control module 18 further includes a network communication card 46 which is connected to the system host 36. The network communication card 46 permits the system control module 18 to receive and transmit data messages from and to the other devices connected to the surveillance system LAN 26, and also handles management of the LAN 26, in a manner which will be described below. The network communications card 46 may be constituted by communications circuitry provided in the well known "LOCALTALK" local area network distributed by Apple Computer, Inc., except that in a preferred embodiment of the invention, the processor used in the LOCALTALK network communication card is replaced with a model 64180 microprocessor available from Xilog or Hitachi. As will be seen, the communication card 46 operates in accordance with the invention under the control of stored programs to carry out communication protocols different from those used in the LOCALTALK LAN.

Network Protocols

The devices connected to the surveillance system LAN 26 are of varying kinds and are required to transmit a variety of types of data at varying and irregular time intervals. For example, the control consoles 14 frequently transmit short data packets that comprise signals for controlling the cameras 12. On the other hand, the cameras 12 are required, on infrequent occasions, to transmit brief data packets indicative of boundary crossings or the like. The data packets transmitted by the consoles 14 are time-critical, but the data transmitted by the cameras 12 usually is not. Furthermore, the system module 18, or other devices connected to the LAN 26, may on occasion be required to transmit significant quantities of configuration data and the like, although generally not in a time-critical fashion.

As will described shortly, the system control module 18 manages the access of all of the devices to the LAN 26 so that the various requirements of the devices can all be met over the common data connection. For this purpose, a variety of techniques are employed, separately or more preferably all in combination. Among these techniques are polling different classes of devices with different degrees of frequency; dynamically shifting devices from one class to another to reflect changes from time to time in the devices needs for access; employment of both group polling messages as well as polling messages directed to particular devices, with procedures to resolve contention occasioned by multiple responses to the group polling messages; an abbreviated negative response to polling messages; a polling message in a format that is shorter than the formats of other data messages; and direct peer-to-peer data transmission in response to polling messages. All of these techniques will be described in more detail below. The use of these techniques permits the system LAN 26 to accommodate a relatively large number of devices with satisfactory throughput and response time.

As has been implied before, all of the hardware making up the LAN 26 and the associated interface circuitry in the system control module 18 and the other devices connected to the LAN 26 may be constituted from standard hardware used for the above-mentioned conventional "LOCAL-TALK" LAN distributed by Apple Computer. Accordingly, in a preferred embodiment, transformer isolated RS-422 signaling and FM-0 encoding are employed, with a clock speed of 230.4 kilobits per second and SDLC (synchronized data link communications) framing.

Device Specific Polling Rates

Turning now to the particular polling and network access management techniques provided in accordance with the invention, it will first be assumed that the devices which are connected to the LAN 26 are to be divided into three classes, X, Y and Z, with 8 devices (i.e. 8 consoles 14) in class X, 96 devices (i.e. 96 cameras 12) in class Y and 10 devices (i.e. 10 auxiliary devices 30) in class Z. Further, it will be assumed to be desired that, at least on average, each device in class X is to be polled at least twenty times per second, each device in class Y is to be polled at least five times per second, and the devices in class Z are to be polled at least once per second. To accommodate the devices in class X, each basic polling cycle should not be longer than 50 ms on average and should include one poll of each device in class X. The number of devices from each of classes Y and Z to be polled during the basic polling cycle is to be determined by dividing the number of devices in the class by the ratio of the polling rate for class X to the respective polling rate for classes Y or Z, and then rounding up to the nearest integer. For example, there are 96 devices in class Y, and the desired frequency of polling for class X is four times the desired frequency for class Y, so that 24 (=96 ÷4) devices from class Y are to be polled during each 50 ms base polling period. Similarly, since the polling frequency is twenty times as great for class X as for class Z, and class Z has 10 devices, the number of devices of class Z to be polled during each 50 ms base polling period is 1 (rounded up from 10/20).

Referring to the 8 devices of class X as devices X1, X2, .... X8, the 96 devices of class Y as Y1, Y2, ... Y96, and the 10 devices of class Z as Z1, Z2, ... , Z10, an exemplary polling sequence in accordance with the invention is set forth as follows:

First polling cycle—poll devices X1 through X8, Y1 through Y24, and Z1.

Second polling cycle—poll devices X1 through X8, Y25 through Y48, and Z2.

Third polling cycle—poll devices X1 through X8, Y49 through Y72, and Z3.

Fourth polling cycle—poll devices X1 through X8, Y73 through Y96, and Z4.

Fifth polling cycle—poll devices X1 through X8, Y1 through Y24, and Z5.

Tenth polling Cycle—poll devices X1 through X8, Y25 through Y48, and Z10.

Eleventh polling cycle—poll devices X1 through X8, Y49 through Y72, and Z1.

Twentieth polling cycle—poll devices X1 through X8, Y73 through Y96, and Z10.

It will be noted, then, that the varying needs of the different types of devices are accommodated by assigning the devices to distinct classes, and then polling devices in different classes with different degrees of frequency. The polling method accordingly can be considered to be "device sensitive".

It should be understood that rather than carry out device sensitive polling with three classes of devices, it is possible to employ the same techniques with two classes or with four or more classes. The more frequently polled classes can be considered "preferred"and the less frequently polled classes can be considered "subordinate". Thus, in the example given above, classes X and Y can be referred to, respectively, as first and second preferred classes with class Z being referred to as a subordinate class. If only two classes of devices are formed, then one may speak simply of a preferred and a subordinate class.

Although it may be convenient to make the less frequent rates integral submultiples of the highest polling rate, this is not required. Neither is it required that the highest polling rate be two or more times the lowest polling rate. For example, as to any two polling rates, the higher polling rate may be N/M times the lower polling rate where N and M are positive integers with N>M. Of course, if M=1, then the lower polling rate is an integral submultiple of the higher polling rate.

Adaptive Assigment to Polling Classes

Figure 3:
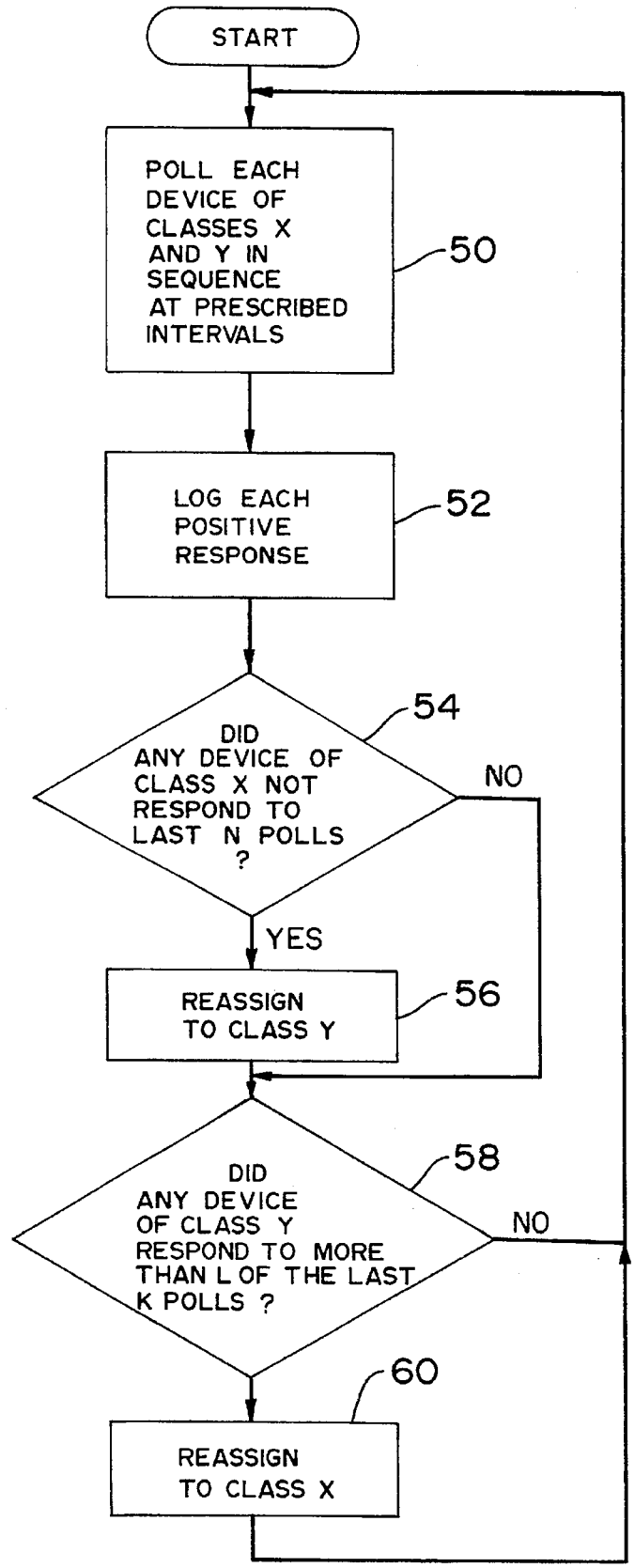
FIG. 3 is a flow chart which illustrates a polling technique carried out by the system control module of FIG. 2.

To further improve the performance of the LAN 26, the system control module 18 may be operated so that the assignments of devices to the various classes are not static, but rather are dynamically adjusted according to the demonstrated needs of the devices for network access. FIG. 3 illustrates a procedure to be carried out in the system control module 18 (particularly in a network communication card 46) in which devices are dynamically reassigned among the polling classes. For the purposes of FIG. 3, it is assumed that all of the devices have been assigned either to a preferred class X or to a subordinate class Y.

The routine of FIG. 3 commences with step 50, at which the system control module 18 polls the devices of class X and class Y in a sequence at prescribed intervals based on a more frequent polling rate for the devices of class X than for the devices of class Y. For example, the first through fourth polling cycles recited above can be carried out (disregarding the references to devices of class Z). When a polled device responds to polling by indicating that it has data to transfer (the indication may be simply the transfer of data), this fact is logged by the system control module 18 (step 52). Then, at step 54, it is determined for each device in class X whether the device has not responded to a consecutive series of a predetermined number of polling messages (i.e. N polling messages). If at step 54 it is determined that the particular device of class X has been unresponsive to the last N polls, then it can be assumed that the device is inactive by reason of being turned off, or not being operated by a human operator, and so forth, and the particular device is accordingly reassigned to class Y (step 56) and the routine then proceeds to the next step, which is step 58. Alternatively, if at step 54 the particular device was found to have responded at least once to the last N polls, then the routine proceeds directly from step 54 to step 58.

At step 58, it is determined for each device in class Y whether the particular device has responded more than a predetermined number of times (i.e. L) to the last K polls directed to the device of class Y, where K also is a predetermined number. If not, the routine loops back to step 50. Otherwise, i.e., if a particular device of class Y has surpassed the predetermined standard of activity for reassignment, then step 60 follows step 58, and the frequently-responding device of class Y is reassigned to class X. It will be noted that the routine loops back to step 50 from step 60.

The particular routine shown in FIG. 3 suggests that the tests of steps 54 and 58 are to be performed at regular intervals, perhaps after every polling cycle or after every Nth polling cycle, where N is the number of polling cycles required to poll all of the devices in class Y. Of course, it is contemplated to perform the tests of step 74 and 58 at longer or shorter intervals. It is also contemplated that the test of step 54 may be performed more or less frequently, rather than equally frequently, in comparison with the test of step 58.

Of course, variations may be made in the tests of steps 54 and 58. For example, to retain assignment to class X, a device may have to have responded twice or more to the last N polling messages directed to the device.

It is also within the contemplation of the invention to perform dynamic reassignment of devices to polling classes when more than two polling classes have been established. In such a case, some of the polling classes may be excluded from the dynamic reassignment scheme.

Integration of Group and Individualized Polling Techniques

The performance of the LAN 26 can be further enhanced in accordance with the invention by combining group polling techniques with the device-by-device polling previously described. Group polling will first be discussed in a simplified form with reference to FIG. 4, which illustrates a procedure to be carried out by the system control module 18. It will be assumed initially for the purposes of the routine of FIG. 4 that there is no classification of the devices connected to LAN 26.

Figure 4:
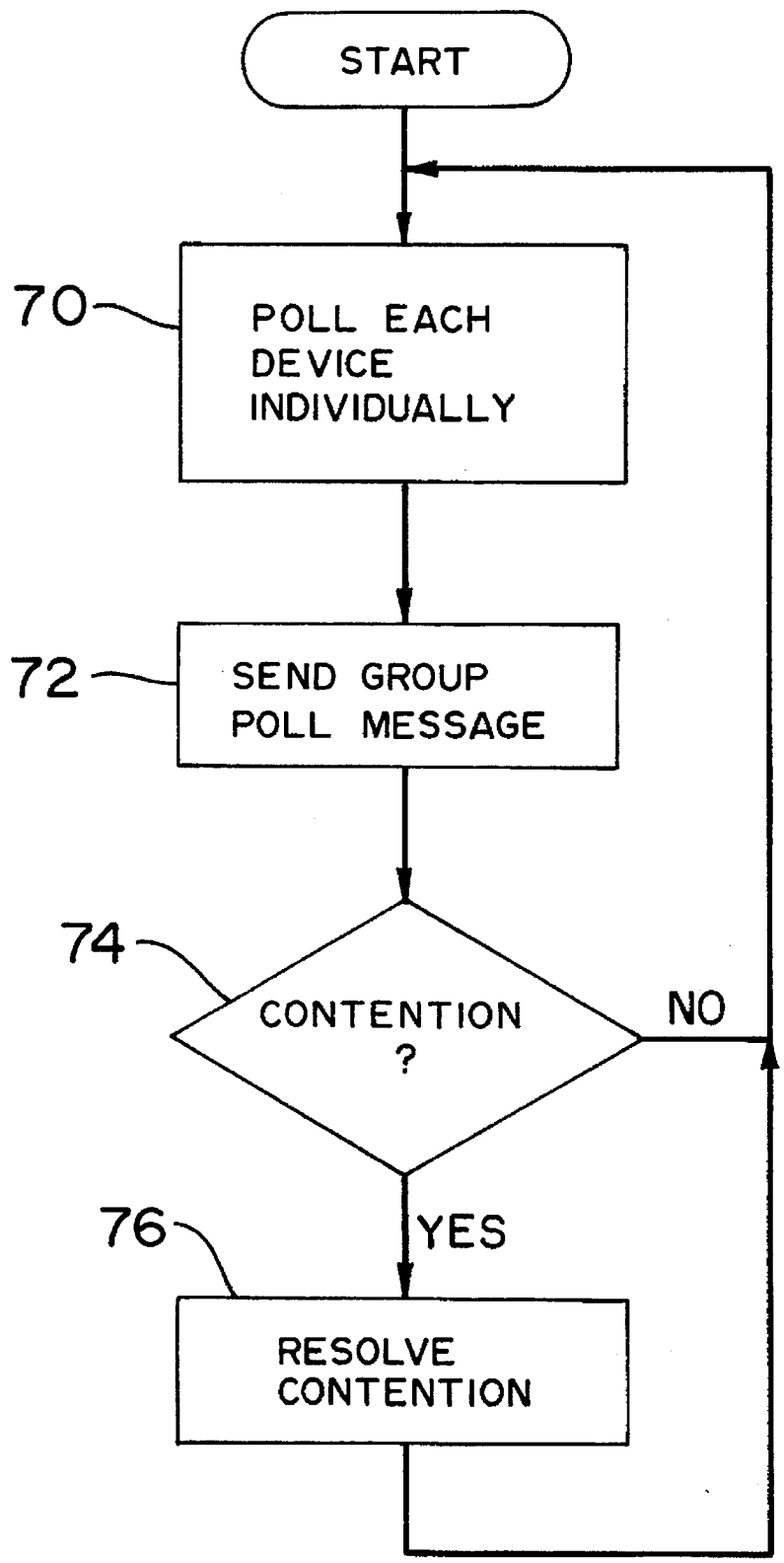
FIG. 4 is a flow chart illustrating another polling technique carried out by the system control module of FIG. 2.

The routine of FIG. 4 starts with step 70, at which the system control module 18 individually polls, in sequence, each device connected to the LAN 26. Following step 70 is step 72, at which the control module 18 broadcasts a group poll message to every device on the LAN 26. Any device which has data to transfer can then respond to the group poll message. There is no difficulty if none of the devices, or only one device, responds to the group poll message. However, if two or more devices respond to the group poll message, then there is contention, which must be resolved. Accordingly, at step 74 (which follows step 72) it is determined whether there is contention. If not, the routine simply loops back to step 70. Otherwise, step 76 follows step 74. At step 76, the contention detected at step 74 is resolved in some manner. According to a preferred embodiment of the invention, the contention is resolved by carrying out a known technique referred to as "probing".

An example of the probing technique is described in "Multiaccess Protocols in Packet Communication Systems," F. A. Tobagi, *IEEE Transactions on Communications*, Vol. COM-28, No. 4, April 1980, pp. 468–488, and particularly page 478. Briefly, during a probing algorithm, the polled group is broken down into subgroups according to a tree structure and the group poll message is repeated to each subgroup. For example, the subgroups may be formed in a binary fashion, such that the main group is first broken down into halves, then quarters, then eighths, and so forth, until the contention is resolved.

After the contention has been resolved so that each of the contending devices has had an opportunity to transfer information, the routine loops back to step 70.

It is contemplated by the invention to apply the technique of FIG. 4 in a number of different ways. For example, step 72 may be performed several times interspersed with step 70, so that a group polling message is delivered several times during the period in which the devices are individually polled in sequence. For example, a quarter of the devices may be individually polled, and then a group polling message sent, with contention resolution if required, then the next quarter of the devices are individually polled and another group message sent and so forth. In this way, the minimum waiting period for each device is reduced to a large extent without greatly adding to the polling overhead.

As another variation, the devices attached to the LAN 26 can be divided into classes with the individual polling of steps 70 applied to devices of a preferred class and then with group polling being applied to the subordinate class with resolution of contention as required. In this case, either the subordinate class may not be individually polled at all (unless required for resolution of contention) or the subordinate class can also be individually polled but less frequently than the devices of the preferred class. Of course, it could also be contemplated to individually poll devices of two classes with equal frequency, but then to periodically use group polling only for one of the two classes.

Group polling can also be applied to two or more groups, of which at least one of the groups is also individually polled. Moreover, group polling can be applied in cases where three or more classes of devices are defined for different polling treatment. It will be recognized that the group polling technique illustrated in basic terms in FIG. 4 can also be applied together with the dynamic reassignment procedure of FIG. 3, albeit at some cost in complexity in terms of the probing technique used to resolve contention where necessary.

Further techniques to improve the performance of the LAN 26 will now be described with reference to FIGS. 5A–5D.

Abbreviated Negative Response to Polling

Figure 5:
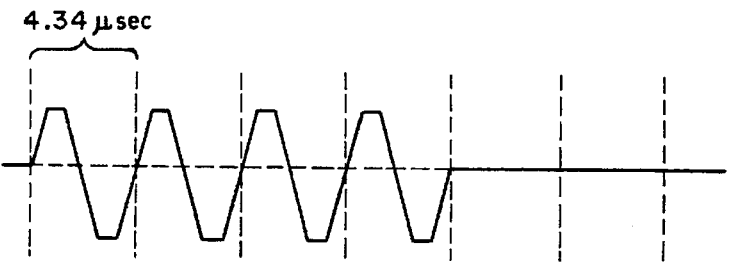
FIG. 5A is a waveform diagram which illustrates a negative response signal transmitted by a polled device in the system of FIG. 1 in response to a polling message.
FIG. 5B illustrates the format of a poll command transmitted by the system control module of FIG. 2.
FIGS. 5C and 5D illustrate formats of other messages transmitted in the system of FIG. 1.

Part of the overhead present in a polling system is the time which elapses while waiting for a response from the polled device. When the polled device has no information to transmit, this fact may be indicated in one of two ways. First, the polled device may simply take no action, in which case the polling device "times out," that is the polling device waits for a predetermined period of time and, if no signal is received from the polled device within that period of time, then the polling device moves on to transmit the next poll in the sequence. As a second alternative, which may be more efficient in terms of timing, the polled device may transmit a signal which indicates that it has no information to send. Typically, such negative responses have been made up of at least a few data bytes. However, in accordance with the invention, the overall time required for polling can be reduced by arranging that the negative response provided by the polled devices be shorter than one byte. A negative response of this type is illustrated in FIG. 5A and consists of a series of line transitions, for instance at least six line transitions, produced over several clock cycles, followed by at least two clock cycles without any line transitions. In the FM-0 encoding scheme, the signal shown in FIG. 5A is made up of four '0' bits followed by two clock periods in which neither a 0 nor a 1 bit is produced. When the polling device (in this case system control module 18), senses the response signal as shown in FIG. 5A, which the polled device has transmitted in response to a polling message sent out by the control module 18, the module 18 immediately proceeds to send the next polling message in the sequence of polling messages. Thus, greater efficiency is obtained than with either the conventional time-out technique or with use of negative poll responses made up of several bytes.

It will be appreciated that the negative poll response shown in FIG. 5A is appropriate for use with polling messages directed to individual devices, but would not be satisfactory as a way of responding to group poll messages. In the case of group poll messages, a time-out technique should be used.

Abbreviated Polling Command

In accordance with another technique of the present invention, the polling overhead can be reduced further by shortening the length of the polling command relative to other types of data messages to be transmitted over the LAN 26. This technique will be described in more detail with reference to FIGS. 5B–5D. FIG. 5B schematically illustrates a format for a poll command to be transmitted by the system control module 18. FIG. 5C shows a format for any one of a number of commands other than the poll command which may be transmitted on the LAN 26 by the control module 18 or by other devices connected to the LAN.

FIG. 5D shows a format for various types of data packet messages that may be transmitted on the LAN 26 by various types of devices connected thereto.

Examination of the formats shown in FIGS. 5B–5D will indicate that the format for the poll command is shorter than the formats for the other types of data messages to be transmitted on the LAN 26. As a result, the poll command can be recognized simply by its length, and without specifying the type of command in the case of the poll command. Further, because the poll command is transmitted so frequently, the reduction in size as compared to the next shortest type of message provides significant savings in overhead. In particular, it will be noted that the poll command shown in FIG. 5B is made up of a start flag byte, an address byte, two bytes of error detection code, and a stop flag byte, for a total of five bytes in all. By contrast, the shortest format for other types of messages includes a type byte for identifying the type of the message in addition to the five bytes present in the format for the poll command. Also, in the data packet format shown in FIG. 5D, each data packet includes a start flag byte, a destination address byte, a source address byte, a type byte which identifies the type of data packet, a destination "socket" address byte, a source "socket" address byte, at least one and no more than 92 data bytes which make up the data to be transferred by means of the data packet, two bytes of error detection code, and a stop flag byte. Thus, each data packet is made up of at least 10 bytes, and possibly as many as 101 bytes.

It will be recognized that, according to these formats, poll commands are made up of a smaller number of bytes than any other command or data message to be transmitted on the LAN 26. Accordingly, polled devices can recognize the poll command simply by its unique length, which is shorter than the length of any other message, and the type byte can therefore be omitted from the poll command, thereby saving time in polling and reducing overhead.

The "type" byte in the format for the other kinds of commands, or in the data packet message format, identifies the kind of the command or data packet. For example, the numerical value contained in the "type" byte may identify a command as an acknowledgment response, or as a reset command. Similarly, the numerical value in the "type" byte in a data packet may identify the packet as being of the kind that requires an acknowledgment or as being of the kind which does not require an acknowledgment. The socket addressing provided by the destination and source socket address bytes allow for separate addressing to distinct points of access or functions within the operating processes provided at each of the devices connected to the LAN 26.

It should be noted that the destination address "255" ("FF" in hexidecimal notation) is preferably reserved for broadcasting so that every device connected to the LAN 26 will consider itself an intended recipient of a command addressed to "255".

Although not separately shown, it will be understood that the command format shown in FIG. 5C can be readily adapted to group polling and probing operations such as those discussed above. For example, a suitable type designation would be indicative of a group command for a given class of devices, and a format for probing commands could include a type byte indicating that the command is a probing command, with two destination address bytes indicative of beginning and ending values of a range of addresses which defines a subclass to which the probing command was directed. Also, for suitable group polling arrangements, it is contemplated to use a five byte format for the initial group polling command, with a "broadcast" destination address byte but no type byte.

Peer-To-Peer Communication in Response to Polling

Figure 6:
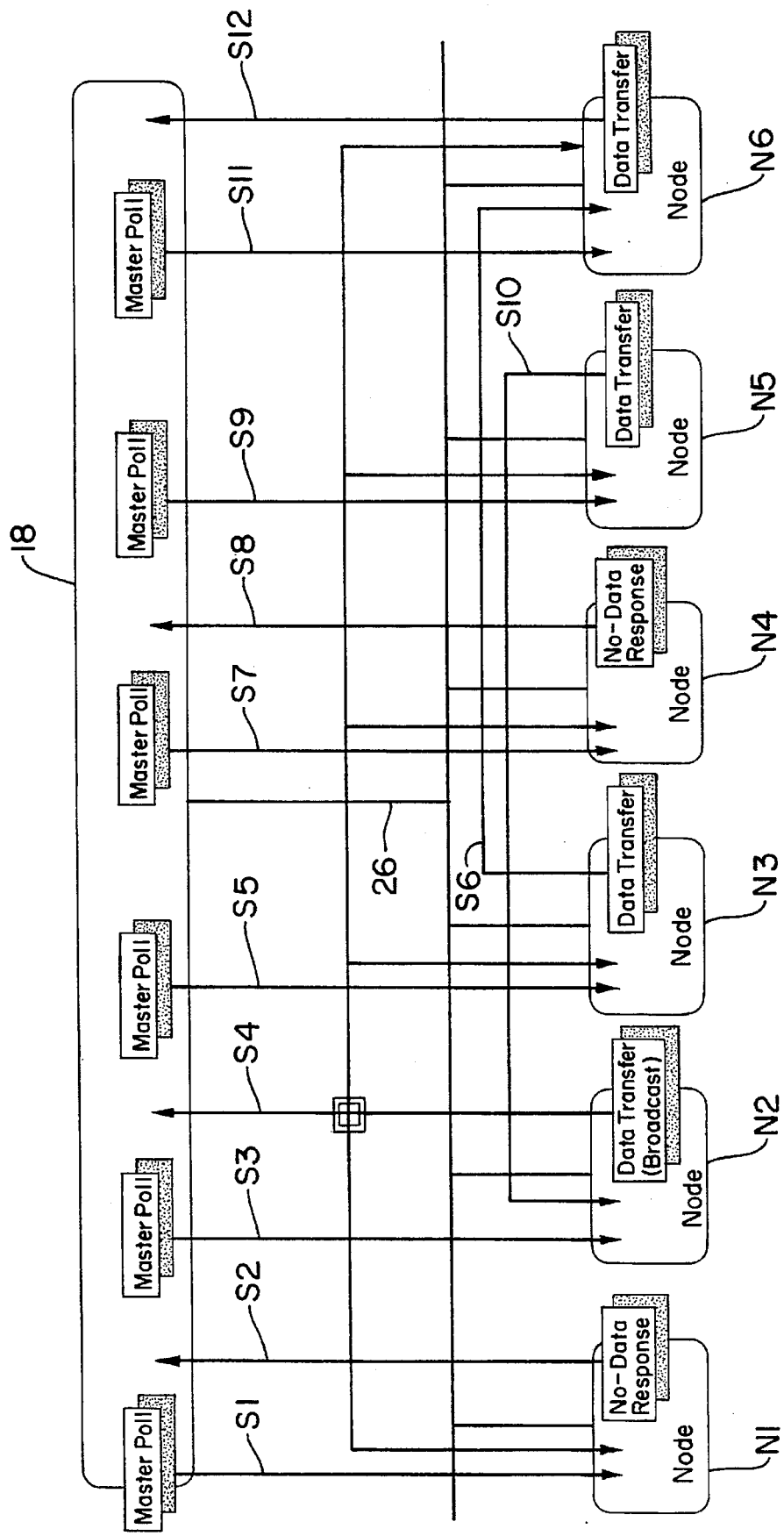
FIG. 6 schematically illustrates an example of a sequence of polling messages and other signals transmitted in the stem of FIG. 1.

FIG. 6 illustrates in schematic terms a sequence of network access operations carried out on LAN 26 in accordance with the invention. The block 18 shown in FIG. 6 represents the system control module acting as a master polling device for controlling access to the LAN 26, and each of the nodes labeled N1 through N6 represents a respective one of the various types of devices other than module 18 which are connected to the LAN 26. Further, FIG. 6 shows signals labeled S1 through S12, all of which are transmitted in sequence over the LAN 26.

More specifically, the first signal in the sequence is a polling command S1 transmitted by the control module 18 and addressed to the node labeled N1. It is assumed that the device corresponding to node N1 has no data to transfer, and accordingly transmits signal S2, which is the negative response having the format shown in FIG. 5A. The next signal in the sequence is S3, which is a polling message transmitted by the control module 18 and addressed to the device corresponding to node N2. This time it is assumed that the device at node N2 has data to transfer, and in fact broadcasts a data packet (signal S4) to every device connected to the LAN 26. The next signal is S5, which is another polling message transmitted from control module 18, and this time addressed to the device at node N3. It is assumed that the device at node N3 has data to transfer to another device (namely that at node N6), so that the device at node N3 responds to the polling message S5 by transmitting a suitably addressed data packet S6 over the LAN 26 directly to the device at node N6.

The next signal in the illustrated sequence is a polling command S7, transmitted by the control module 18 and addressed to the device at node N4. It is assumed that this device has no data to transfer, and therefore transmits a signal S8 that is the negative response as shown in FIG. 5A.

The next signal in the sequence is a polling command S9 transmitted by the control module 18 and addressed to the device at node N5. It is now assumed that the device at node N5 has data to transfer to the device at node N2 and accordingly responds to the command S9 by transmitting a data packet S10 addressed to the device at node N2.

The next signal transmitted is another poll command S11 transmitted by the control module 18 and addressed to the device at node N6. In this case, it is assumed that the device at node N6 has data to transfer to the control module 18 so that the device at node N6 responds to the poll command S11 by transmitting a data packet S12 which is addressed to the control module 18.

A notable feature of the sequence shown in FIG. 6 is that devices are permitted to respond to polling messages by transmitting data directly to another device (other than module 18), rather than transmitting the data to the master polling device for transfer to the ultimate recipient. This direct transfer of data in response to polling provides further improvement in the performance of the LAN 26. Examples of such direct data transfers are the data packets S4, S6, and S10.

In general, no device other than the control module 18 is permitted to access the LAN 26 except in response to a poll command that is addressed, either individually or by group, to the particular device. However, the one exception to this rule is that a device which is a recipient of a data packet which calls for acknowledgment is permitted to respond to such data packet by immediately transmitting an acknowledgment or non-acknowledgment message.

Surveilance System Formed of Subsystems

Figure 7:
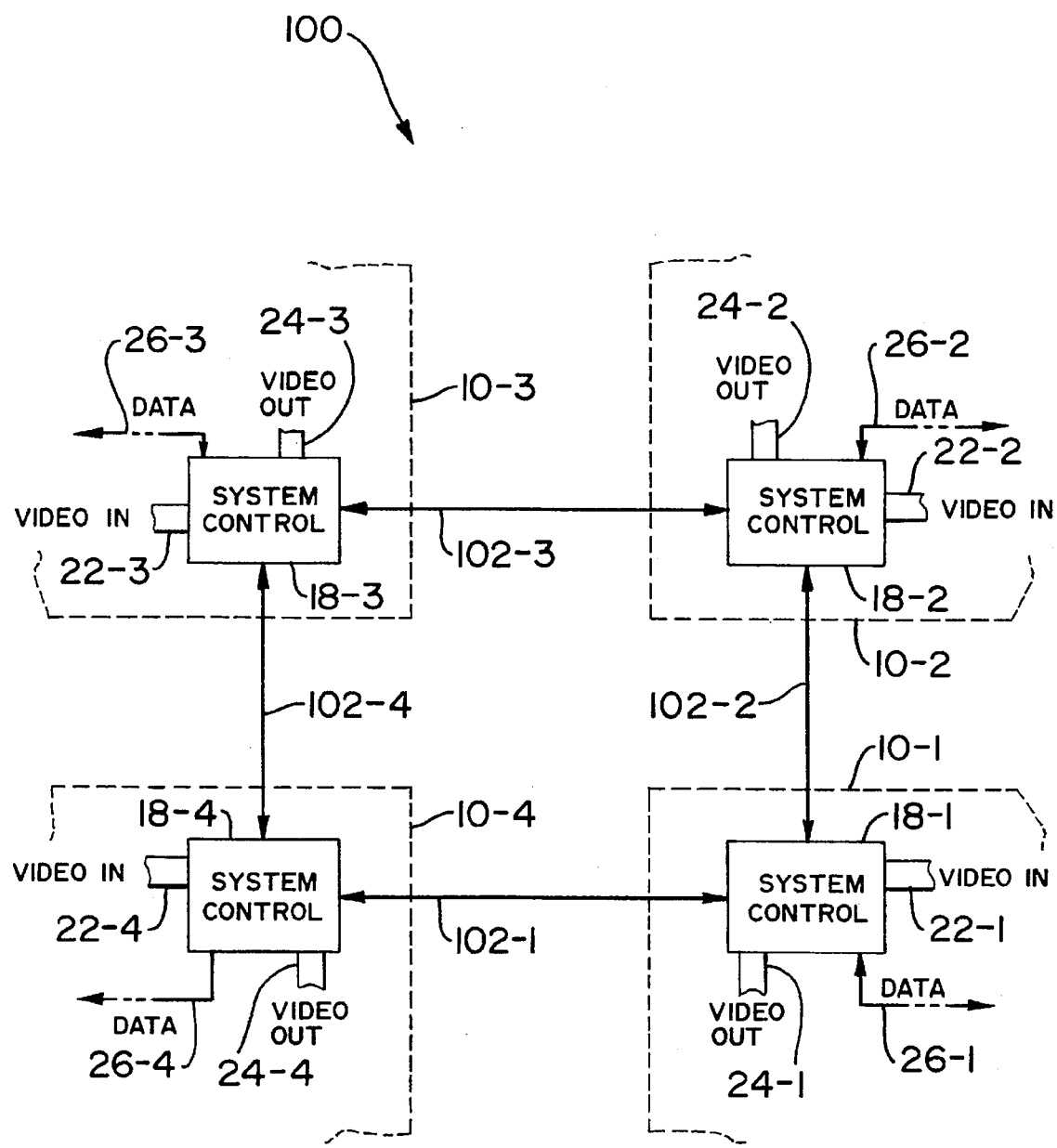
FIG. 7 is a simplified schematic diagram of a local area network made up of subnetworks in accordance with the invention.

According to a preferred embodiment of the invention, a video surveillance system 10 and the LAN 26 thereof are arranged to accommodate up to 20 or 30 control consoles and up to about 100 cameras. However, it is contemplated to form still larger video surveillance systems by interconnecting a number of networks 10, as schematically illustrated in FIG. 7. In FIG. 7, reference numeral 100 generally indicates a video surveillance system made up of subsystems 10-1, 10-2, 10-3 and 10-4. Video and data connections 102-1, 102-2, 102-3 and 102-4 are provided to link the respective control modules of the subsystems. A particular one of the control modules, say, module 18-1, is designated as a master module to manage the interconnections between systems. For purposes of illustration, only four subsystems are shown in FIG. 7, but it is contemplated to interconnect 40 or more subsystems, to produce a very large surveillance system which includes perhaps 4,000 cameras and a large number of camera control consoles.

For the most part, polling techniques to be provided in accordance with the invention have been described herein independently of each other, and it certainly is contemplated to use some, rather than all, of the techniques disclosed herein. However, it should be recognized that all of the techniques disclosed herein can be implemented in a single LAN management protocol, and this is in fact done in a preferred embodiment of the invention. That is, in a single preferred embodiment, the negative response, poll command, and other message formats of FIGS. 5A–5D are all employed, together with classification of devices for polling at different polling rates, dynamic reassignment of devices among polling classes, group polling as to at least some classes of devices, with contention resolution as required, and peer-to-peer messaging in response to polling commands. As a result, all of the devices making up a large video surveillance network can be accommodated by a single local area data network with satisfactory performance in terms of throughput and mean delay time for network access.

Although the network management techniques provided in accordance with the invention have been described in connection with a LAN for serving a video surveillance system, it should be recognized that the inventive techniques are applicable to other environments. Also, although the techniques have been described in connection with a transmission medium made up of a twisted wire pair, it should be noted that these techniques can be applied to other types of transmission media, such as coaxial cable or optical fiber, as well as to wireless communication by infrared and so forth.

Although the present invention has been described with reference to presently preferred embodiments thereof, it should be understood that various changes can be made without departing from the true spirit of the invention as defined in the appended claims.

What is claimed is:

1. A method of polling a plurality of interconnected devices, said devices each being capable of receiving and sending data messages, said plurality of devices including a preferred group of devices and a subordinate group of devices, said preferred and subordinate groups being mutually exclusive, wherein said devices of said preferred group are polled at least N/M times as frequently as said devices of said subordinate group, N and M both being positive integers with N>M;

each of said devices of said preferred group responding to polling by transmitting either a first type of response indicating that said device has no data to send or a second type of response indicating that said device has data to send, and further comprising the steps of:
determining how frequently each device of said preferred group transmits the first type of response; and
reassigning said device from said preferred group to said subordinate group if said device transmits the first type of response more frequently than a predetermined degree of frequency.

2. A method according to claim 1, wherein M=1.

3. A method of polling a plurality of interconnected devices, said devices each being capable of receiving and sending data messages, said plurality of devices including a preferred group of devices and a subordinate group of devices, said preferred and subordinate groups being mutually exclusive, wherein said devices of said preferred group are polled at least N/M times as frequently as said devices of said subordinate group, N and M both being positive integers with N>M;

each of said devices responding to polling by transmitting either a first type of response indicating that said device has no data to send or a second type of response indicating that said device has data to send, and further comprising the steps of:
determining how frequently each device of said subordinate group transmits the second type of response; and
reassigning said device from said subordinate group to said preferred group if said device transmits the second type of response more frequently than a predetermined degree of frequency.

4. A method according to claim 3, further comprising the steps of:
determining how frequently each device of said preferred group transmits the first type of response; and
reassigning said device from said preferred group to said subordinate group if said device transmits the first type of response more frequently than another predetermined degree of frequency.

5. A method according to claim 4, wherein said second type of response includes at least a predetermined plurality of bytes and said first type of response is shorter in duration than said predetermined plurality of bytes.

6. A method according to claim 5, wherein said first type of response is shorter in duration than one byte.

7. A method of polling a plurality of interconnected devices, said devices each being capable of receiving and sending data messages, said plurality of devices including a first group of said devices and a second group of said devices, said first and second groups being mutually exclusive, the method comprising the steps of:
transmitting a polling message at least N times to each device of said first group of devices during a period of time, N being an integer greater than two; and
transmitting a polling message once and only once during said period of time to each device of said second group of devices;

each of said devices responding to polling by transmitting either a first type of response indicating that said device has no data to send or a second type of response indicating that said device has data to send, and further comprising the steps of:

determining how frequently each device of said first group transmits the first type of response; and reassigning said device from said first group to said second group if said device transmits the first type of response more frequently than a predetermined degree of frequency.

8. A method according to claim 7, further comprising the steps of:

determining how frequently each device of said second group transmits the second type of response; and reassigning said device from said second group to said first group if said device transmits the second type of response more frequently than another predetermined degree of frequency.

9. A method of polling a plurality of interconnected devices, said devices each being capable of receiving and sending data messages, said plurality of devices including a first group of said devices and a second group of said devices, said first and second groups being mutually exclusive, the method comprising the steps of:

transmitting a polling message at least N times to each device of said first group of devices during a period of time, N being an integer greater than two; and transmitting a polling message once and only once during said period of time to each device of said second group of devices;

wherein each of said devices of said second group responds to polling by transmitting either a first type of response indicating that said device has no data to send or a second type of response indicating that said device has data to send, and further comprising the steps of:

determining how frequently each device of said second group transmits the second type of response; and reassigning said device from said second group to said first group if said device transmits the second type of response more frequently than a predetermined degree of frequency.

10. A method of polling a plurality of interconnected devices, said devices each being capable of receiving and sending data messages, said plurality of devices including a preferred group of said devices and a subordinate group of said devices, said preferred and subordinate groups being mutually exclusive, the method comprising the steps of:

first transmitting a first polling message once and only once in sequence to each device of said subordinate group of devices; and second transmitting a polling message at least N times to each device of said preferred group of devices after commencing said first transmitting step and before transmitting any polling message other than said first polling message to any device of said subordinate group, where N is an integer greater than one;

wherein each of said devices responds to polling by transmitting either a first type of response indicating that said device has no data to send or a second type of response indicating that said device has data to send, and further comprising the steps of:

determining how frequently each device of said preferred group transmits the first type of response; and reassigning said device from said preferred group to said subordinate group if said device transmits the first type of response more frequently than a predetermined degree of frequency.

11. A method according to claim 10, further comprising the steps of:

determining how frequently each device of said subordinate group transmits the second type of response; and reassigning said device from said subordinate group to said preferred group if said device transmits the second type of response more frequently than another predetermined degree of frequency.

12. A method of polling a plurality of interconnected devices, said devices each being capable of receiving and sending data messages, said plurality of devices including a preferred group of said devices and a subordinate group of said devices, said preferred and subordinate groups being mutually exclusive, the method comprising the steps of:

first transmitting a first polling message once and only once in sequence to each device of said subordinate group of devices; and second transmitting a polling message at least N times to each device of said preferred group of devices after commencing said first transmitting step and before transmitting any polling message other than said first polling message to any device of said subordinate group, where N is an integer greater than one;

wherein each of said devices of said subordinate group responds to polling by transmitting either a first type of response indicating that said device has no data to send or a second type of response indicating that said device has data to send, and further comprising the steps of:

determining how frequently each device of said subordinate group transmits the second type of response; and reassigning said device from said subordinate group to said preferred group if said device transmits the second type of response more frequently than a predetermined degree of frequency.

13. A method of polling a plurality of interconnected devices, said devices each being capable of receiving and sending data messages, said plurality of devices including a first preferred group of devices, a second preferred group of devices and a subordinate group of devices, said first preferred group, said second preferred group and said subordinate group all being mutually exclusive, wherein:

said devices of said first preferred group are polled at least N times as frequently as said devices of said subordinate group, N being an integer greater than one; and said devices of said second preferred group are polled at least M times as frequently as said devices of said subordinate group, M being an integer greater than one and different from N.

14. A method according to claim 13, wherein N is an integral multiple of M.

15. A method of polling a plurality of interconnected devices, said devices each being capable of receiving and sending data messages, said plurality of devices including a first group of said devices and a second group of said devices, said first and second groups of devices each consisting of a respective plurality of said devices, the method comprising the steps of:

first transmitting to each device of said first group of devices, according to a predetermined sequence, a polling message that is uniquely addressed to the respective device of said first group of devices;

after said first transmitting step, second transmitting a group polling message simultaneously to all devices of said second group of devices;

detecting whether contention among said devices of said second group occurs in response to said group polling message; and if contention is detected at said detecting step, resolving the detected contention by performing a probing algorithm;

each of said devices of said first group responding to polling by transmitting either a first type of response indicating that said device has no data to send or a second type of response indicating that said device has data to send, and further comprising the steps of:

determining how frequently each device of said first group transmits the first type of response; and reassigning said device from said first group to said second group if said device transmits the first type of response more frequently than a predetermined degree of frequency.

16. A method of polling a plurality of interconnected devices, said devices each being capable of receiving and sending data messages, said plurality of devices including a preferred group of devices and a subordinate group of devices, said preferred and subordinate groups being mutually exclusive, the method comprising the steps of:

polling said devices of said subordinate group by means of polling messages each addressed to a distinct one of said devices of said subordinate group with a first degree of frequency;

polling said devices of said preferred group by means of polling messages each addressed to a distinct one of said devices of said preferred group with a second degree of frequency which is N/M times a great as said first degree of frequency, N and M both being positive integers with N>M;

transmitting a group polling message simultaneously to all devices of said subordinate group of devices with a third degree of frequency;

detecting whether contention among said devices of said subordinate group occurs in response to said group polling message; and if contention is detected at said detecting step, resolving the detected contention by performing a probing algorithm;

wherein each of said devices of said preferred group responds to polling by transmitting either a first type of response indicating that said device has no data to send or a second type of response indicating that said device has data to send, and further comprising the steps of:

determining how frequently each device of said preferred group transmits the first type of response; and reassigning said device from said preferred group to said subordinate group if said device transmits the first type of response more frequently than a predetermined degree of frequency.

17. A method according to claim 16, wherein said third degree of frequency is the same as said first degree of frequency.

18. A method according to claim 16, wherein M=1.

19. A method according to claim 18, wherein N is greater than two.

20. A method of polling a plurality of interconnected devices, said devices each being capable of receiving and sending data messages, each of said data messages other than polling messages being in a first predetermined format consisting of at least N bytes, N being an integer greater than one, the method comprising the steps of sending said polling messages in sequence to each of said devices, said polling messages each being in a second predetermined format consisting of M bytes, wherein M is a positive integer that is less than N.

21. A method according to claim 20, wherein M=5 and N=6.

22. A method according to claim 21, wherein each of said polling messages consists of a start flag byte, an address byte for identifying a respective one of said devices to which the polling message is sent, an error detection code consisting of two bytes, and a stop flag byte.

23. A method according to claim 22, wherein each of said data messages other than polling messages includes at least a start flag byte, an address byte for identifying a respective one of said devices to which the data message is sent, a type byte for identifying a type of the data message, an error detection code consisting of two bytes, and a stop flag byte.

24. A method according to claim 23, wherein some of said data messages also include at least one byte of data to be transferred.

25. A method according to claim 24, wherein none of said data messages includes more than 92 bytes of data to be transferred.

26. A method of operating a data network formed of a plurality of interconnected devices including a master polling device and other devices, the method comprising the steps of:

transmitting a respective polling message in sequence from the master polling device to each of said other devices; and transmitting data messages from said other devices in response to the respective polling messages;

wherein said data messages transmitted from said other devices in response to the respective polling messages each consist of at least N bytes and said respective polling messages each consist of M bytes, with N and M being positive integers and M less than N.

27. A method according to claim 26, wherein M=5 and N=6.

28. A method according to claim 27, wherein each of said polling messages consists of a start flag byte, an address byte for identifying a respective one of said devices to which the polling message is sent, an error detection code consisting of two bytes, and a stop flag byte.

29. A method according to claim 28, wherein each of said data messages that is not a polling message includes at least a start flag byte, an address byte for identifying a respective one of said devices to which the data message is sent, a type byte for identifying a type of the data message, an error detection code consisting of two bytes, and a stop flag byte.

30. A method of operating a data network formed of a plurality of interconnected devices including a master polling device and other devices, the method comprising the steps of:

transmitting a polling message from the master polling device to a first one of said other devices; and in response to said polling message, transmitting a data message directly from a first one of said other devices to a second one of said other devices.

31. A method according to claim 30, wherein said data message is transmitted simultaneously to a plurality of said other devices.

32. A method according to claim 31, wherein said data message is transmitted to said master polling device at the same time said data message is transmitted to said plurality of other devices.

33. A method by which a polled device responds to a polling message received by the polled device from a data network, the network including a plurality of devices which are capable of receiving and sending data messages, network means for interconnecting the devices for data communication among the devices, and means for sending polling messages to said plurality of devices, the method comprising the steps of:

sending a data message consisting of at least N bytes if the polled device has data to send, N being a positive integer; and transmitting a poll response signal that does not include any bytes if the polled device has no data to send; said poll response signal consisting of a plurality of line transitions followed by an absence of line transitions for a period of at least two clock cycles.

34. A method according to claim 33, wherein said plurality of line transitions includes no less than six line transitions.

35. A method according to claim 34, wherein said data message is transmitted by FM-0 encoding and said poll response signal consists of four '0' bits followed by said absence of line transitions.

36. A data communication network comprising:

a first group of devices including a first plurality of devices capable of receiving and sending data messages;

a second group of devices including a second plurality of devices capable of receiving and sending data messages, said first and second groups being mutually exclusive;

means for interconnecting all of said devices to provide a signal path thereamong; and polling means for sending polling messages to said devices via said signal path, said polling means sending a respective polling message to each device of said first group at least N/M times as frequently as to each device of said second group, N and M both being positive integers with N>M;

wherein each of said devices of said first group responds to polling by transmitting either a first type of response indicating that said device has no data to send or a second type of response indicating that said device has data to send, and further comprising:

means for determining how frequently each device of said first group transmits the first type of response; and means for reassigning said device from said first group to said second group if said device transmits the first type of response more frequently than a predetermined degree of frequency.

37. A data communication network according to claim 36, wherein M=1.

38. A data communication network comprising:

a first group of devices including a first plurality of devices capable of receiving and sending data messages, said first and second groups being mutually exclusive;

means for interconnecting all of said devices to provide a signal path thereamong; and polling means for sending polling messages to said devices via said signal path, said polling means sending a respective polling message to each device of said first group at least N/M times as frequently as to each device of said second group, N and M both being positive integers with N>M;

wherein each of said devices of said second group responds to polling by transmitting either a first type of response indicating that said device has no data to send or a second type of response indicating that said device has data to send, and further comprising:

means for determining how frequently each device of said second group transmits the second type of response; and means for reassigning said device from said second group to said first group if said device transmits the second type of response more frequently than a predetermined degree of frequency.

39. A data communication network according to claim 36, wherein said means for connecting includes a twisted wire pair connected to each of said devices and said polling means.

40. A data communication network comprising:

a first group of devices including a first plurality of devices capable of receiving and sending data messages;

a second group of devices including a second plurality of devices capable of receiving and sending data messages, said first and second groups being mutually exclusive;

means for interconnecting all of said devices to provide a signal path thereamong; and polling means for sending polling messages to said devices via said signal path, said polling means sending a respective polling message to each device of said first group at least N times during a period of time, N being an integer greater than two, and sending a respective polling message once and only once during said period of time to each device of said second group of devices;

wherein each of said devices of said first group responds to polling by transmitting either a first type of response indicating that said device has no data to send or a second type of response indicating that said device has data to send, and further comprising:

means for determining how frequently each device of said first group transmits the first type of response; and means for reassigning said device from said first group to said second group if said device transmits the first type of response more frequently than a predetermined degree of frequency.

41. A data communication network comprising:

a first group of devices including a first plurality of devices capable of receiving and sending data messages;

a second group of devices including a second plurality of devices capable of receiving and sending data messages, said first and second groups being mutually exclusive;

means for interconnecting all of said devices to provide a signal path thereamong; and polling means for sending polling messages to said devices via said signal path, said polling means sending to each device of said first group, according to a predetermined sequence, a polling message that is uniquely addressed to the respective device of said first group of devices, and then sending a group polling message simultaneously to all devices of said second group of devices;

means for detecting whether contention among said devices of said second group occurs in response to said group polling message; and means for resolving contention detected by said means for detecting by performing a probing algorithm;

wherein each of said devices of said first group responds to polling by transmitting either a first type of response indicating that said device has no data to send or a second type of response indicating that said device has data to send, and further comprising:

means for determining how frequently each device of said first group transmits the first type of response; and means for reassigning said device from said first group to said second group if said device transmits the first type of response more frequently than a predetermined degree of frequency.

42. A data communication network comprising:

a first group of devices including a first plurality of devices capable of receiving and sending data messages;

a second group of devices including a second plurality of devices capable of receiving and sending data messages, said first and second groups being mutually exclusive;

means for interconnecting all of said devices to provide a signal path thereamong; and polling means for sending polling messages to said devices via said signal path, said polling means sending to each device of said second group, with a first degree of frequency, a respective polling message that is uniquely addressed to the device of the second group, said polling means also sending to each device of said first group, with a second degree of frequency, a respective polling message that is uniquely addressed to the device of the first group, said second degree of frequency being N/M times as great as said first degree of frequency (N, M being positive integers with N>M), and said polling means also sending a group polling message simultaneously to all devices of the second group with a third degree of frequency;

means for detecting whether contention among said devices of said second group occurs in response to said group polling message; and means for resolving contention detected by said means for detecting by performing a probing algorithm;

wherein each of said devices of said first group responds to polling by transmitting either a first type of response indicating that said device has no data to send or a second type of response indicating that said device has data to send, and further comprising:

means for determining how frequently each device of said first group transmits the first type of response; and means for assigning said device from said first group to said second group if said device transmits the first type of response more frequently than a predetermined degree of frequency.

43. A data communication network according to claim 42, wherein said third degree of frequency is the same as said first degree of frequency.

44. A data communication network according to claim 42, wherein M=1.

45. A data communication network according to claim 41, wherein N is greater than two.

46. A data communication network comprising:

a plurality of devices capable of receiving and sending data messages;

means for interconnecting all of said devices to provide a signal path thereamong;

polling means for sending polling messages to said devices via said signal path, each of said data messages other than said polling messages being in a first predetermined format consisting of at least N bytes, N being an integer greater than one, said polling messages each being in a second predetermined format consisting of M bytes, wherein M is a positive integer that is less than N.

47. A data communication network according to claim 46, wherein M=5 and N=6.

48. A data communication network according to claim 47, wherein each of said polling messages consists of a start flag byte, an address byte which uniquely identifies a respective one of said devices to which the polling message is sent, an error detection code consisting of two bytes, and a stop flag byte.

49. A data communication network according to claim 48, wherein each of said data messages that is not a polling message includes at least a start flag byte, an address byte for identifying a respective one of said devices to which the data message is sent, a type byte for identifying a type of the data message, an error detection code consisting of two bytes, and a stop flag byte.

50. A data communication network comprising:

a plurality of devices capable of receiving and sending data messages;

means for interconnecting all of said devices to provide a signal path thereamong; and polling means for sending a polling message to a first one of said plurality of devices;

wherein said first one of said plurality of devices selectively responds to said polling message by sending a data message via said signal path directly to a second one of said plurality of devices, said second one being distinct from said polling means.

51. A data communication network according to claim 50, wherein said first one of said plurality of devices selectively sends said data message simultaneously to more than one of said plurality of devices.

52. A data communication network according to claim 51, wherein said first one of said plurality of devices selectively sends said data message simultaneously to said polling means and to every device of said plurality of devices except for said first one of said plurality of devices.

53. A data communication network according to claim 50, wherein said means for interconnecting comprises a twisted wire pair connected to all of said plurality of devices and to said polling means.

54. A data communication network comprising:

a plurality of devices capable of receiving and sending data messages;

means for interconnecting all of said devices to provide a signal path thereamong; and polling means for sending polling messages to said devices via said signal path;

wherein each of said devices responds to a respective polling message addressed to the device by selectively sending one of a data message consisting of at least N bytes, N being a positive integer, and a poll response signal that does not include any bytes; said poll response signal consisting of a plurality of line transitions followed by an absence of line transitions for a period of at least two clock cycles.

55. A data communication network according to claim 54, wherein said data message is transmitted by FM-0 encoding and said poll response signal consists of four '0' bits followed by said absence of line transitions.

56. A data communication network according to claim 55, wherein said plurality of line transitions includes no less than six line transitions.

57. A data communication network according to claim 56, wherein said means for connecting includes a twisted wire pair connected to each of said devices and said polling means.

58. A method of polling a plurality of interconnected devices, said devices each being capable of receiving and sending data messages, said plurality of devices including a preferred group of devices, a subordinate group of devices and a master polling device, said preferred and subordinate groups being mutually exclusive, the method comprising the steps of:

polling said devices of said subordinate group by means of polling messages each addressed to a distinct one of said devices of said subordinate group with a first degree of frequency;

polling said devices of said preferred group by means of polling messages each addressed to a distinct one of said devices of said preferred group with a second degree of frequency which is N/M times as great as said first degree of frequency, N and M both being positive integers with N>M;

transmitting a group polling message simultaneously to all devices of at least one of said subordinate group of devices and said preferred group of devices with a third degree of frequency;

detecting whether contention among said devices of said at least one group occurs in response to said group polling message;

if contention is detected at said detecting step, resolving the detected contention by performing a probing algorithm;

determining how frequently each device of said preferred group responds to polling by indicating that said device has no data to send; and reassigning said device from said preferred group to said subordinate group if said device indicates that it has no data to send more frequently than a predetermined degree of frequency;

and wherein:

each of the devices of said preferred and subordinate groups responds to polling messages uniquely addressed to the polled device by transmitting a negative poll response signal that does not include any bytes if the polled device has no data to send;

each of said data messages other than polling messages is in a first predetermined format consisting of at least K bytes and each of said polling messages is in a second predetermined format consisting of L bytes, where K and L are positive integers with K>L;

and at least some of said devices of said preferred and subordinate groups selectively respond to polling messages addressed thereto by transmitting a data message directly from the polled device to another of said devices that is not said master polling device.

59. A method according to claim 58, wherein said third degree of frequency is the same as one of said first degree of frequency and said second degree of frequency.

60. A method according to claim 58, wherein K=6 and L=5.

61. A method according to claim 58, wherein said negative poll response signal consists of a plurality of line transitions followed by an absence of line transitions for a period of at least two clock cycles.

62. A method according to claim 58, wherein said subordinate group of devices includes a plurality of remotely controllable video cameras and said preferred group of devices includes a plurality of control consoles for controlling the video cameras.

* * * * *